(12) United States Patent
Casselman et al.

(10) Patent No.: US 6,185,297 B1
(45) Date of Patent: Feb. 6, 2001

(54) LOW POWER DIALER

(75) Inventors: Patrick H. Casselman, Ogdensburg;
Marshall W. Pharoah, Canton;
Valentin Purits, Heuvelton; Neal Rudolph, Ogdensburg; John R. Zabel, Canton, all of NY (US)

(73) Assignee: Mitel, Inc., Reston, VA (US)

( * ) Notice: Under 35 U.S.C. 154(b), the term of this patent shall be extended for 0 days.

(21) Appl. No.: 09/079,280

(22) Filed: May 15, 1998

(51) Int. Cl.$^7$ .................................................. H04M 11/00
(52) U.S. Cl. ........................... 379/387; 379/355; 379/413
(58) Field of Search .................................. 379/413, 393, 379/395, 396, 377, 355, 93.36, 32

(56) References Cited

U.S. PATENT DOCUMENTS

| | | | | |
|---|---|---|---|---|
| 4,723,267 | * | 2/1988 | Jones et al. | 379/93.05 |
| 5,485,509 | * | 1/1996 | Oliver | 379/106.06 |
| 5,668,870 | * | 9/1997 | Dahlquist | 379/377 |
| 5,881,139 | * | 3/1999 | Romines | 379/112 |

FOREIGN PATENT DOCUMENTS

| | | |
|---|---|---|
| 2 192 768 | 7/1986 | (GB) . |
| 2 290 674 | 6/1994 | (GB) . |

\* cited by examiner

*Primary Examiner*—Stella Woo
(74) *Attorney, Agent, or Firm*—Pascal & Associates

(57) ABSTRACT

A telephone dialer for connection to a public switched telephone network (PSTN) and to a station apparatus, for receiving digits dialed from the station apparatus and for adding digits or substituting digits for the dialed digits and for redialing digits to the PSTN wherein the redialed digits are comprised of the dialed and added digits or comprised of substituted digits, the dialer further comprising an adjustable hold circuit for connection to the PSTN during an interval when the redialed digits are being output, for holding a line associated with the PSTN in an offhook condition, the adjustable hold circuit having a load connectable to the PSTN line which is variable with PSTN line voltage at the dialer such as to draw a variable current sufficient to meet predetermined current and voltage criteria of the line at the dialer.

13 Claims, 4 Drawing Sheets

LOW POWER DIALER

FIELD OF THE INVENTION

This invention relates to the field of telephony, and in particular to an improved dialer.

BACKGROUND TO THE INVENTION

Dialers are used to interface station apparatus with a line extending to the public switched telephone network (PSTN). In one application of dialers, they store access numbers of preferred carriers. Various carriers may be preferred to save cost, due to bandwidth provisions or noise specifications, due to corporate agreements, etc.

To provide the dialing function, the dialer detects an offhook condition of the station apparatus, splits the line, receives digits dialed from the station apparatus, analyzes at least some of the dialed digits, and then either adds digits to the dialed digits and redials them to the PSTN, or substitutes and redials a different set of digits.

Due to the above requirements, dialers have required an auxiliary (but typically built-in) power supply. In a corporate environment where there is a telephone room which houses a PABX, a mains source is usually close by. Personnel are usually available to program the dialer as to the alternate or auxiliary directory numbers to dial. However, in a domestic residential environment, mains power sources are not necessarily available close by the dialer. For example, it may be desirable to locate the dialer close to where a subscriber's line enters the residence, which may be beside the basement joists where there is no mains power socket.

In addition, where such a dialer is purchased from a retailer, the customer may not be sufficiently skilled to program the dialer.

In a residential environment, if the dialer would be line powered, there may not be sufficient line voltage to operate the dialer reliably, and the result would be attempted operation of the dialer in a condition which would be against regulations of the authorities. Typical residences do not have the equipment or skill set to determine whether the line voltage is sufficient to meet regulations.

A problem with telephone line powered equipment involves maintenance, i.e. how they are to be programmed and how the programs are to be updated or changed. If the unit is to be locally programmed, this requires the presence of a person who is capable of programming, which is costly to the service provider, who may have to travel to the customer premises to perform the programming.

Remote programming had been made by counting the number of calls made and then dialing a remote maintenance site after a predetermined number of calls have been made. Another method has been used by having the maintenance site dial up the site to maintain it after it answers the line.

In calling up the line powered dialer from a remote maintenance site, the audible ringing will be heard from the customer's station apparatus. If a call is made to a remote maintenance site following a certain number of calls, this can occur during a heavy traffic period on the line. Thus these methods can disturb or inconvenience the customer, which is particularly undesirable in a residence application.

Another design concern for dialers is to meet the regulatory requirements for loop voltage and current.

Another design concern for dialers is the prevention of noise outside the telephone audio band (e.g. above 3400 Hz) from reaching the telephone line, and the passage of audio signals between the subscriber side of the dialer and the telephone network side of the dialer during the interval when the dialer is outdialing digits.

Typically some type of filter has been used to prevent the out of band noise from reaching the telephone line. However, this approach tends to be limited in effectiveness because it is difficult to achieve attenuation greater than 30 to 40 dB.

A prior art approach to determine the need for an external power supply included the measurement of the voltage across the telephone line with the telephone offhook, and the use of the product in operation to determine whether it will function. This is an hit or miss situation, which can produce an unhappy customer since the customer may consider that he has purchased an inoperative product. In addition, measurement of the voltage requires the use of test equipment which may not be available in the average residence.

Sometimes a light emitting diode is used to indicate proper operation voltage. However a light emitting diode consumes electrical current which reduces the line length over which the dialer will operate.

SUMMARY OF THE INVENTION

The present invention is a subscriber line powered dialer which can automatically regulate the current/voltage characteristics of the power received from the PSTN, so as to meet regulations and thus to seize a line from the PSTN reliably.

The dialer can also confirm to a purchaser (e.g. by providing a tone in a handset of the station apparatus) either each time the station apparatus is used, or once on installation, that the line voltage received from the PSTN is satisfactory to operate the dialer. If no confirmation signal is received, the purchaser will know that an auxiliary power supply is required to power the dialer.

The line powered dialer can also automatically dial to a programming location at a predetermined time (e.g. during the middle of the night), and obtain any of operation programs, auxiliary or substitute digits to dial when certain digits are dialed on the station apparatus, and operation parameters.

In accordance with an embodiment of the invention, a telephone dialer for connection to a public switched telephone network (PSTN) and to a station apparatus, for receiving digits dialed from the station apparatus and for adding digits or substituting digits for the dialed digits and for redialing digits to the PSTN wherein the redialed digits are comprised of the dialed and added digits or comprised of substituted digits, further comprises an adjustable hold circuit for connection to the PSTN during an interval when said redialed digits are being output, for holding a line associated with the PSTN in an offhook condition, the adjustable hold circuit having a load connectable to the PSTN line which is variable with PSTN line voltage at the dialer such as to draw a variable current sufficient to meet predetermined current and voltage criteria of said line at the dialer.

In accordance with another embodiment, a telephone dialer for splitting a line between a public switched telephone network (PSTN) and a station apparatus location, is comprised of a circuit for generating subscriber line voltage and current from power supplied by the PSTN on said line and for applying said voltage and current to the line to the station apparatus location following the split, and a warning circuit for detecting voltage across a PSTN line and voltage across the line to which the station apparatus may be connected, and for providing a first signal in the event the difference in the voltages is greater than a predetermined value as an indicator that an auxiliary local power supply is not required.

In accordance with another embodiment, a telephone dialer for connection to a public switched telephone network (PSTN) and to a station apparatus, for receiving digits dialed from the station apparatus and for adding digits or substituting digits for the dialed digits and for redialing digits to the PSTN wherein the redialed digits are comprised of the dialed and added digits or comprised of substituted digits, further comprises a memory for storing data for operation of the dialer, a controller circuit connected to receive operating current from the line to the PSTN, the controller circuit drawing current which is less than a predetermined line leakage current which is less than that required to seize or hold said line, the controller for automatically controlling dialing of a predetermined directory number over a PSTN line at a predetermined time, and for receiving from a dialed location via the PSTN line and storing, said data for further operation of the telephone dialer.

In accordance with another embodiment, a telephone dialer for splitting a line between a public switched telephone network (PSTN) and a station apparatus location, comprises a circuit for generating subscriber line voltage and current from power supplied by the PSTN on said line and for applying said voltage and current to the line to the station apparatus location following the split, and at least one constant current circuit for generating the subscriber line voltage and current from the power supplied by the PSTN and for applying said voltage and current from the constant current circuit to the line to the station apparatus.

BRIEF DESCRIPTION OF THE DRAWINGS

A better understanding of the invention will be obtained by a consideration of the detailed description below, in conjunction with the following drawings, in which.

DETAILED DESCRIPTION OF EMBODIMENTS OF THE INVENTION

Figure 1:
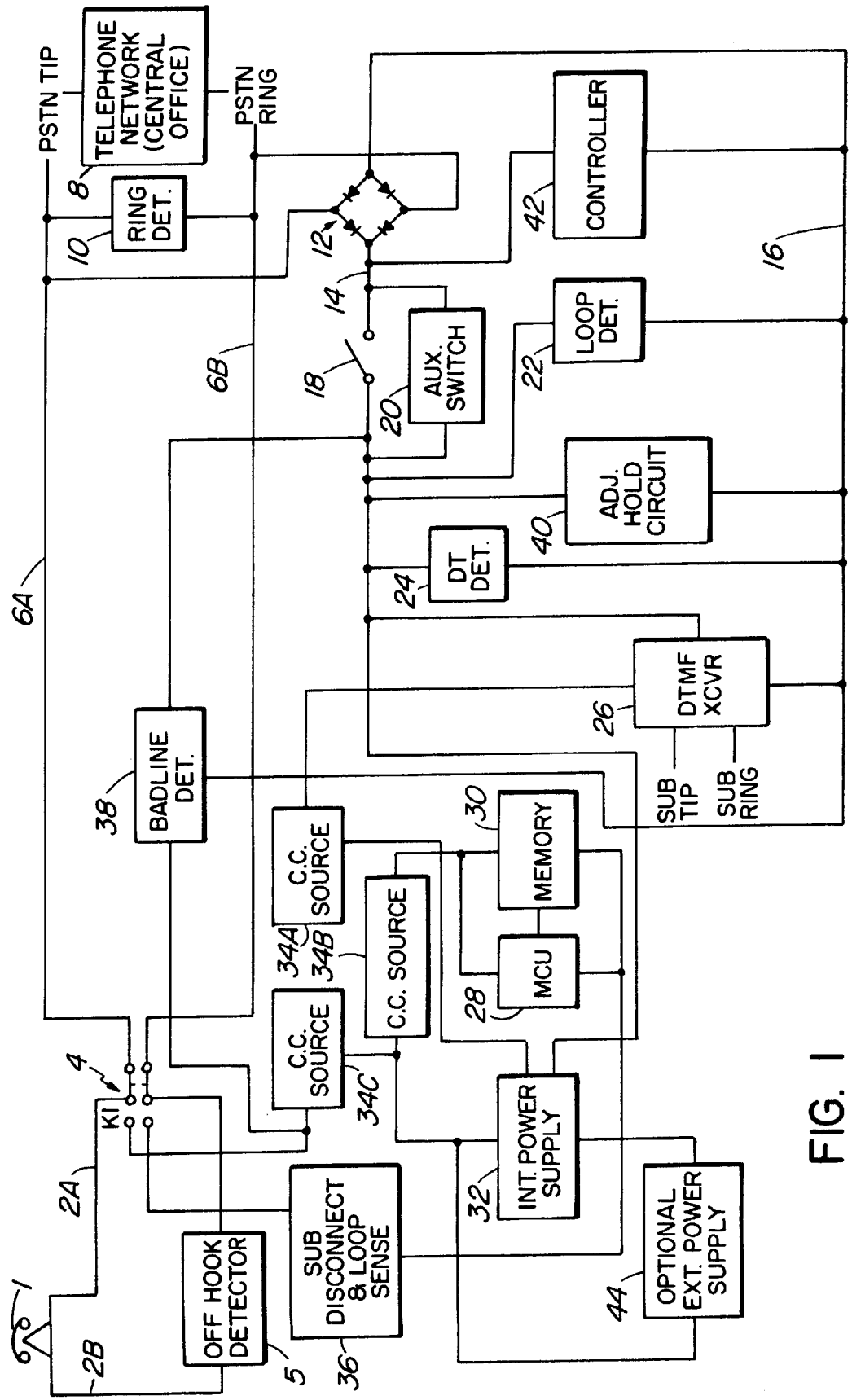
FIG. 1 is a block diagram of a dialer which incorporates the embodiments of the invention.

Turning to FIG. 1, station apparatus shown in the form of a telephone set 1 (but which could be other station apparatus which can dial directory numbers) is connected via subscriber line tip and ring leads Sub Tip 2A and Sub Ring 2B to contacts 4 of a line splitting relay. An offhook detector 5 is connected to at least one of the tip and ring leads 2A and 2B.

The relay contacts 4 are also connected to the tip and ring leads PSTN Tip and PSTN Ring 6A and 6B which leads to a central office 8 of a PSTN. The contacts are shown in the idle or telephone set on-hook condition, in which the circuit is ready to receive ringing signals from the PSTN, which are routed through contacts 4 to the telephone set 1. A ring detector 10 is connected to the PSTN Tip and PSTN Ring leads 6A and 6B.

A bridge rectifier 12 is connected across the leads 6A and 6B, for providing properly polarized power to the dialer circuits. The resulting voltage is provided across lines 14 and 16, positive line 14 being extended via relay contact 18 and auxiliary switch 20.

A loop detector 22, dial tone detector 24 and dual tone multifrequency (DTMF) transceiver are fed the voltage output from rectifier 12, following closure of either contact 18 or switch 20. The output port of DTMF transceiver 26 is also connected to the voltage lines leading to rectifier 12 in order to apply DTMF dialing or other control tones to the line to the PSTN.

The dialer is controlled by a controller MCU 28, to which memory 30 is coupled. Memory 30 stores the control programs to be executed by the controller 28, as well as parameters to be used and substitute and/or additional numbers to be dialed under control of the controller. An internal power supply 32 is supplied with power from the switched output of the rectifier 12. The power supply is also coupled via a constant current source 34C to a relay contact 4 which is closed to the tip lead 2A during the dialer line split condition. A subscriber disconnect and loop sense circuit 36 (which can detect pulse dialling) is coupled to another relay contact 4 which is closed to the ring lead 2B during the dialer line split condition.

A bad line detector 38 is connected across the switched power lines 14 and 16, and to the relay contact 4 which is closed to the tip lead 2A during the dialer line split condition.

An adjustable hold circuit 40 is also connected across the switched power lines 14 and 16. A controller 42 is connected across the unswitched power lines 14 and 16.

In operation, the subscriber's station apparatus (e.g. a telephone) is connected to the sub tip and ring leads 2A and 2B. The telephone network is connected to the PSTN tip and ring leads 6A and 6B. Normally, during an idle condition, the sub tip and ring leads 2A and 2B are metallically connected to the PSTN tip and ring leads through relay contacts 4.

When the subscriber goes offhook by lifting the handset of the station apparatus, e.g. to make an outgoing call, the offhook condition of leads 2A and 2B is detected by the offhook sense circuit 5 and the metallic connection from leads 2A and 2B to leads 6A and 6B is broken by the controller 28 receiving the offhook information from the offhook sense circuit 5 and in response causing operation of the relay having contacts 4, in a well known manner.

However, in an embodiment of this invention, switch 20 is also closed under control of controller 28. The badline detector 38 evaluates the voltage across the sub tip and ring leads 2A and 2B, and the voltage across leads 14 and 16 (which is representative of the potential difference across leads 6A and 6B leading to the PSTN. If the difference in voltages across the leads 2A and 2B is not far enough below the voltage across leads 14 and 16 so that operation of the dialer without an auxiliary power supply is not practical, the badline detector 38 signals the processor 28.

The controller causes a signal, such as an audio frequency signal, to be provided to the subscriber indicating when the line voltage conditions are good. If this signal is not generated, the subscriber will know from the installation instructions that an auxiliary power supply is needed. In that case, an external power supply 44 such as one which is plugged into mains power or a battery, can be connected across the internal power supply 32, in order to provide sufficient operating power for the dialer.

For outgoing calls, as noted above the subscriber goes offhook and the offhook sense circuit 5 detects the change in loop condition. The relay having contacts 4 is activated and the subscriber station apparatus is connected to constant current source 34C. This constant current source limits the power dissipated in the station apparatus and reduces the amplitude of the audio signal which can pass from the leads 2A to the leads 14 and 16. The processor 28, receives the offhook signal from the offhook sense circuit 5. Loop current causes a relay to close contacts 18, which connects loop voltage from the PSTN to pass through the bridge 12 to the power supply 32, to the adjustable hold circuit 40, and to the other circuits connected to lines 14 and 16 once contacts 18 have been closed.

Various circuits are now activated to process the outgoing call. DTMF subscriber dialed digits are detected by DTMF transceiver 26, and rotary dial pulses are detected by sense circuit 36. Dial tone from the PSTN is detected using the dial tone detector 24.

The operating power supplied to the various circuits is controlled by the constant current sources 34A and 34B to eliminate out of band noise and the passage of audio back to the subscriber line leads 2A and 2B.

The adjustable hold circuit 40 ensures that DC mask requirements for regulatory agencies for the network are met. The hold circuit current/voltage characteristic can be adjusted to accommodate various dial-out conditions when the dialer operates. For example the requirements can be varied from a remote location in an automatic dial-out maintenance operation, by downloading programs and/or parameters for controlling the current/voltage characteristics of the hold circuit. The characteristics can be different in a normal line power operation mode, or when used with an external power supply.

The adjustable hold circuit has multiple control inputs for receiving control signals from the controller 28, which manages the hold circuit characteristics in accordance with the operating mode. This will be described in more detail later in this specification.

The content of the digits dialed by the subscriber is screened by the controller 28. The controller 28 can be programmed to manage the outgoing call according to pre-programmed action codes. The controller adds or substitutes digits e.g. by consulting a look-up table addressed by the dialed digits which returns the added or substituted digits. The controller then controls the DTMF transceiver to generate corresponding outgoing DTMF signals which are applied to the leads 14 and 16 for transmission via rectifier 12 to the leads 6A and 6B to the PSTN for controlling a remote switching system. Thus the outgoing digits may not be identical with those dialed by the subscriber. Of course, if desired in place of DTMF signals, pulse dial outgoing signals can be generated.

In order to program the controller 28, the controller 42 which operates at very low currents, below the levels mandated by regulation for line leakage currents, executes a "call home" process. This is performed at a preselected time when the subscriber station apparatus is onhook, e.g. in the middle of the night.

In a call home process, the controller 42 causes the auxiliary switch 20 to close, which connects the PSTN loop voltages through the bridge to the dialer circuits. The controller 28 then controls the DTMF generator to dial a preselected directory number, which is processed as described above. The apparatus at a remote maintenance center accessed by the dialed directory number answers the call, and receives tones which can denote the dialer identity and/or subscriber directory number, etc. The apparatus at the directory number then transmits programming, substitute or auxiliary dialing digits, and parameters to the dialer, for storage in memory 30 and subsequent use by the controller 28. If the programming, etc. signals are tones, these are received by DTMF transceiver 26 and the data is tranferred to the controller 28 for storage in memory 30. If the programming etc. signals are in logical data form, this can be received by controller 42 and the data is passed to controller 28.

If desired, the call home process can be initiated by the subscriber dialing some predetermined digits. The call home process can be initiated under other conditions as may be desirable.

If a remote programming session is in progress and the subscriber goes offhook to make a call, the dialer disconnects the line by turning off the hold circuit 40, the power supply 32 and breaks the subscriber loop connection momentarily using the sub disconnect and loop control 36, under control of controller 28. The dialer then restores the telephone loop leads 2A and 2B allowing the subscriber's call to proceed.

In the event it is desired to locally program the dialer, the subscriber enters a preprogrammed access code, which causes the dialer to enter into a programming mode. The user may then enter codes to set up various features of the dialer.

If an incoming call is received, the ringing detector 10 senses the presence of ringing. The dialer remains transparent, passing the incoming ringing signals from leads 6A and 6B to leads 2A and 2b via contacts 4 to the subscriber's station apparatus. However, if the unit is programmed to auto-answer, the dialer will wait for a preprogrammed number of cycles of ringing to occur before closing the auxiliary switch 20, and will operate the hold circuit, which provides a termination to answering the incoming call. Thus if desired, the dialer can be set up in auto-answer mode to receive a telephone call from a maintenance location, and to then receive programming signals as described above.

In a further alternative, the auto-answer mode can connect a voice-mail system or telephone answering device to the leads 6A and 6B.

In the event an external power supply 44 is used, the dialer can be designed to have fewer constant current sources if the power supply sequencing is non-critical for the application.

The dialer can also be implemented with an additional bridge circuit to separate the controller 42 from the telecommunications interface to extend the line length over which it will operate.

Figure 2:
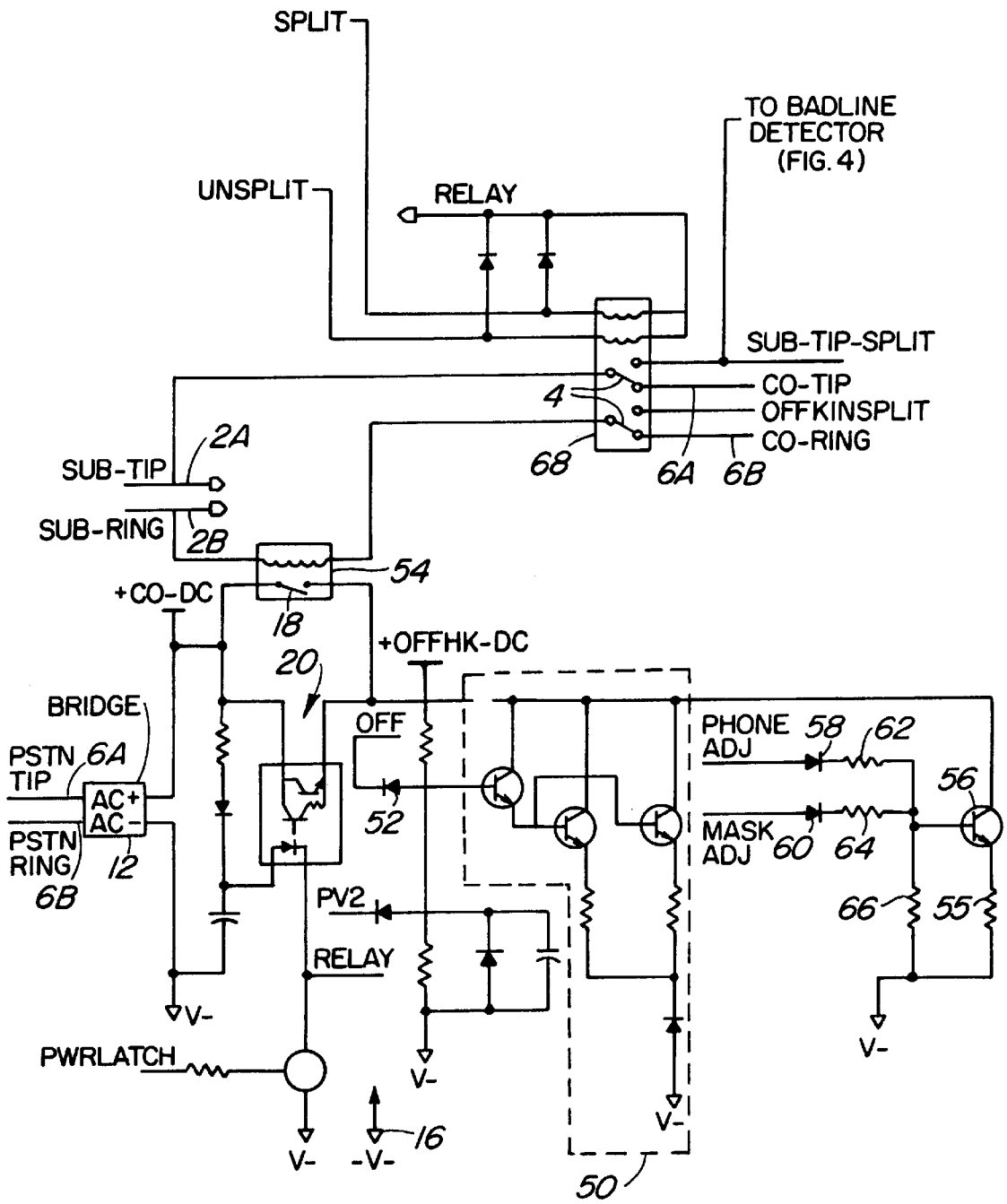
FIG. 2 is a schematic diagram of an adjustable hold circuit.

FIG. 2 illustrates a schematic diagram of the novel adjustable hold circuit. A normal hold circuit 50 is provided which is comprised of a load that is switched across the line to be held, e.g. leads 14 and 16. The normal hold circuit is formed of a pair of parallel connected NPN bipolar transistors each having a resistor in its collector circuit connected via a diode across the line to be held. The bipolar transistors are driven by a further NPN transistor coupled via a diode 52 to an OFF control lead driven by an output from controller 28. The junction of the input to the normal hold circuit 50 is connected via contact 18 of a relay 54 which is connected via bridge 12 to leads 6A and 6B to the PSTN.

The ring detector 10 is a standard well known circuit and is not shown.

A preferred form of the adjustable hold circuit is further comprised of an NPN bipolar transistor which has its emitter-collector circuit with the emitter connected in series with a resistor 55 across the leads 14 and 16. The base of transistor 56 is driven from any of several enable inputs such as PHONEADJ and MASKADJ coupled via respective diodes 58 and 60 in series with respective resistors 62 and 64. Resistor 66 provides bias current to the base of transistor 56 from lead 16 (V−).

The enable inputs PHONEADJ and MASKADJ are coupled to outputs of controller 28.

When relay contacts 18 are closed, current from the PSTN is passed from leads 6A and 6B via bridge 12 to leads 14 and 16. If desired, an impedance matching circuit can be connected across leads 14 and 16. To hold the line to the PSTN, the normal hold circuit is invoked upon command from controller 28 via the OFF lead, the normal hold circuit 30 is enabled and passes current between leads 14 and 16.

Depending on the program or parameters stored in memory 30, controller 28 can adjust the amount of current drawn by the hold circuit. It does this by applying an enable signal to either or both of the PHONEADJ and MASKADJ leads. This will cause transistor 56 to draw current based on the ratio of resistor 62 to resistor 66, or resistor 64 to resistor 66. The adjustable hold may be turned off by controller 28 by setting the anodes of diodes 58 and 60 low.

One lead of the coil of relay 54 is connected to the subscriber ring lead 2B and the other lead is connected to the leaf of contacts 4 of a latching relay 68. The tip lead 2A is connected to the other leaf of contacts 4. In the idle condition, when PSTN voltage is provided to leads 6A and 6B, the station apparatus going offhook will thus cause relay 54 to operate, extending the PSTN voltage to leads 14 and 16.

The latching enable coil and the unlatching enable coil of latching relay 68 are coupled to SPLIT and UNSPLIT enable inputs coupled to outputs of the controller 28. On enabling these respective enable inputs, the controller can control the position of the contacts 4, and therefore whether the line is metallically coupled through from leads 2A and 2B to 6A and 6B, or whether the line is split for operation of the dialer.

Figure 3:
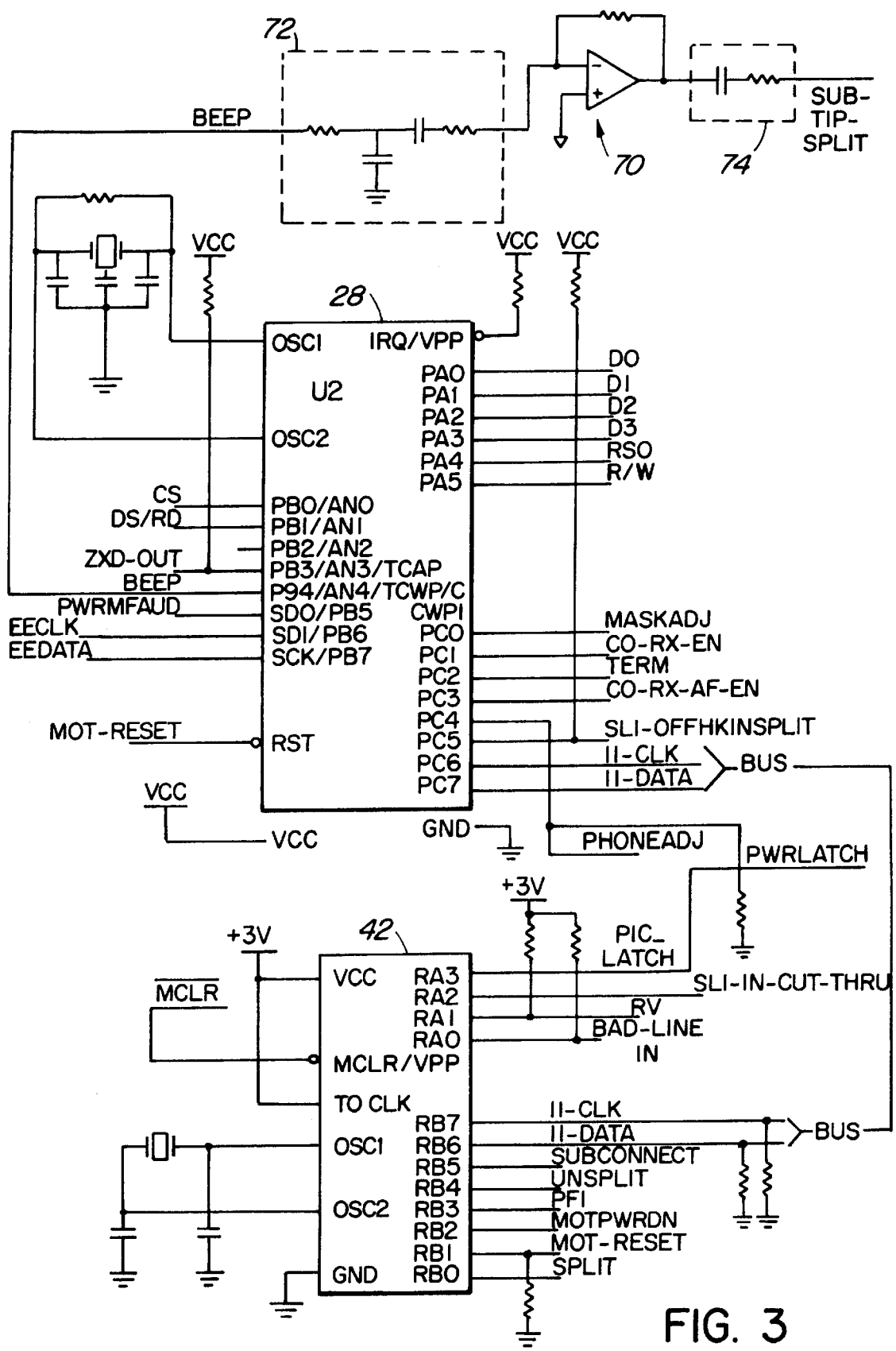
FIG. 3 is a schematic diagram of controllers and a bad line warning circuit.

FIG. 3 illustrates controller 42 and controller 28. The controllers are preferably microprocessors which are both coupled to bus CLK and DATA whereby controller 28 can send control signals to control controller 42, and controller 42 can send any of program, digit and parameter data signals received from a remote maintenance terminal to controller 28.

Controller 28 has a control output labelled BEEP, at which it applies an audio frequency signal in the event the dialer does not require an auxiliary power supply. That output is coupled to an amplifier 70 via input and output impedance matching circuitry 72 and 74. The amplifier 70 is coupled to one of the contacts 4 of relay 68 so as to transmit the audio signal to the station apparatus of the subscriber to indicate that no external power supply is required.

It should be noted that the audio signal can be transmitted to the subscriber's station apparatus each time the subscriber lifts his handset. Alternatively the controller 28 can be programmed to enable the beep only when the station apparatus first goes offhook after initial installation, or at the first offhook per day, or after initial offhook, only after a power outage.

Figure 4:
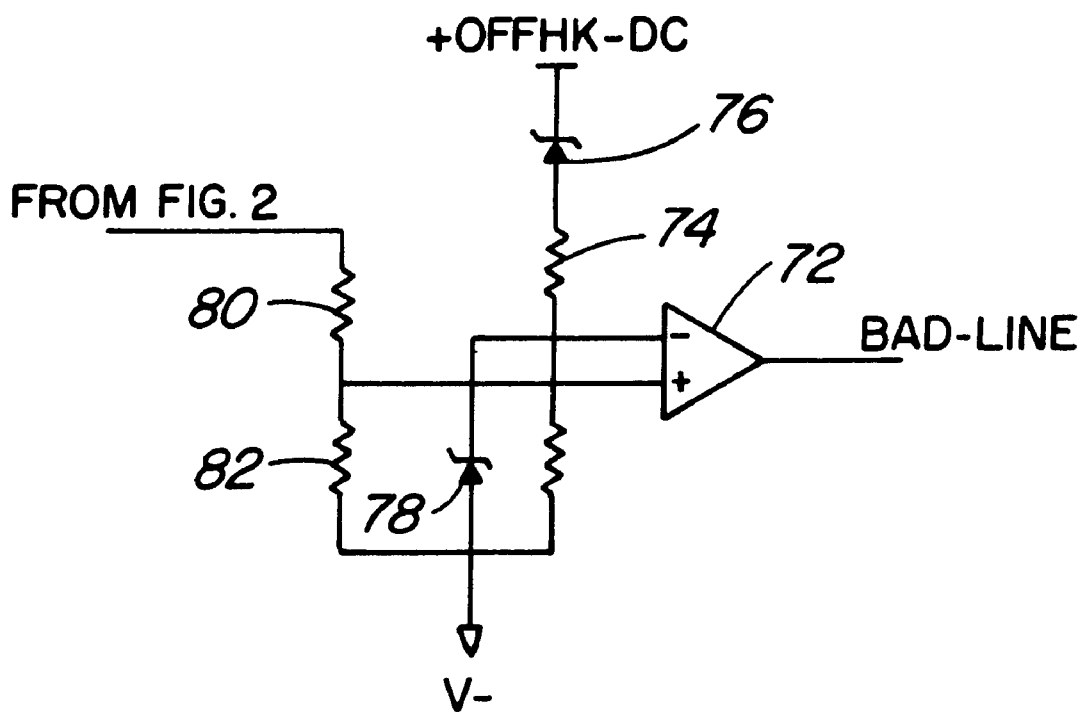
FIG. 4 is a schematic diagram of bad line detection circuit.

A preferred form of a badline detector 38 is shown in FIG. 4. This circuit is comprised of a comparator having its negative input connected via resistor 74 and zener diode 76 to the switched line 14 (OFFHK-DC), and to lead 16 (V−) via diode 78.

The positive input of comparator 72 is connected to the tap of a voltage divider comprised of resistors 80 and 82, which is connected between lead 16 and the contact 4 of relay 68 which is connected to subscriber line lead 2A when relay 68 is latched in the dialer active position.

The comparator 72 thus compares the voltage differences between the lines 14 and 16 to the PSTN and the line to the subscriber, and if insufficient, provides an output on lead BAD-LINE. That lead is coupled to an input to controller 42, which passes corresponding data via the bus CLK DATA to controller 28 for generation of an audio signal to the subscriber as noted above.

An improved dialer is thus provided which is line powered under normal circumstances, has an automatically controllable hold impedance, can automatically receive operation programs, digits and parameters from a remote maintenance location, and can automatically warn the user that the line has insufficient voltage and requires an auxiliary power supply. The dialer can thus be sold to the unskilled user for installation without technical skill.

A person understanding this invention may now conceive of alternate embodiments and enhancements using the principles described herein. All such embodiments and enhancements are considered to be within the spirit and scope of this invention as defined in the claims appended hereto.

We claim:

1. A telephone dialer for connection between a public switched telephone network (PSTN) and a station apparatus comprising, means for splitting the line between the PSTN and the station apparatus, comprising a circuit for generating subscriber line voltage and current from power supplied by the PSTN on aid line and for applying said voltage and current to the line to the station apparatus following the split, and at least one constant current circuit for generating the subscriber line voltage and current from the power supplied by the PSTN and for applying said voltage and current form the constant current circuit line to the line to the station apparatus, and means for receiving digits dialed from the station apparatus for analyzing said dialed digits, and for dialed and added digits or comprised of substituted digits, the dialer rubber comprising an adjustable hold circuit for connection to the PSTN during an interval when said transmitted digits are being output, for holding a line associated with the PSTN in an offhook condition, the adjustable told circuit having a load connectable to the PSTN line which is variable with the PSTN line voltage at the dialer such as to draw a variable current sufficient to meet predetermined current and voltage criteria of said line at the dialer.

2. A dialer as defined in claim 1 in which the variable load is comprised of a normal load and an auxiliary load, the auxiliary load having at least one enable input for causing the auxiliary load to draw current in parallel with the normal load on being enabled, and a further circuit for detecting voltage of said line and for causing application of an enable signal to the enable input.

3. A dialer as defined in claim 2, the auxiliary load having at least two enable inputs for causing the auxiliary load to draw either of at least two different currents in parallel with the normal load on being respectively enabled, the further circuit causing application of an enable signal to one of the enable inputs to cause the auxiliary load to draw a correct amount of current so as to meet said predetermined criteria.

4. A dialer as defined in claim 2, in which the auxiliary load is comprised of an emitter-collector circuit of a bipolar transistor connected in series with a resistor coupled between one of a tip and ring lead of the line and a power supply rail, a base of the transistor being coupled via a resistor and diode connected in series to a terminal of a processor, the processor being programmed with the detected voltage of said line so as to generate the enable signal depending on a relationship of the detected voltage and the current and voltage criteria.

5. A dialer as defined in claim 4, including a controller for automatically controlling dialing of a predetermined directory number over a PSTN line at a predetermined time, and for receiving from a dialed location via the PSTN line and storing, data representing said predetermined criteria.

6. A dialer as defined in claim 1 including a warning circuit for detecting voltage across a PSTN line and voltage across a subscriber line to which the station apparatus may be connected, and for providing a first signal in the event the difference in the voltages is greater than a predetermined value as an indicator that an auxiliary local power supply is not required.

7. A dialer as defined in claim 6 in which the warning circuit is comprised of a processor for generating an audio frequency tone and an amplifier for applying an amplified representation of the tone to the subscriber line.

8. A telephone dialer for splitting a line between a public switched telephone network (PSTN) and a station apparatus location, comprising a circuit for generating subscriber line voltage and current from power supplied by the PSTN on said line and for applying said voltage and current to the line to the station apparatus location following the split, and a warning circuit for detecting voltage across a PSTN line and voltage across the line to which the station apparatus may be connected, and for providing a first signal in the event the difference in the voltages is greater than a predetermined value as an indicator that an auxiliary local power supply is not required.

9. A telephone dialer as defined in claim 8, in which the warning circuit is comprised of a comparator for comparing an offhook voltage on the line to the station apparatus with voltage on the line to the PSTN and for generating an enabling signal for said first signal.

10. A telephone dialer as defined in claim 9 in which the warning circuit is further comprised of a processor for receiving the enabling signal and for generating the audio frequency tone upon receipt of the enabling signal, and an amplifier for applying an amplified representation of the tone to the line to the station apparatus.

11. A telephone dialer as defined in claim a including a controller circuit connected to receive operating current from the line to the PSTN, (the controller circuit drawing current which is less than a predetermined line leakage current which is less than that required to seize or hold said lined) the controller for automatically controlling dialing of a predetermined directory number over a PSTN line at a predetermined time, and for receiving from a dialed location via the PSTN line and storing, data representing at least one of programs and data for further operation of the telephone dialer.

12. A telephone dialer as claimed in claim 1, the dialer further comprising a memory for storing data for operation of the dialer, a controller circuit connected to receive operating current from the line to the PSTN, the controller circuit drawing current which is less than a predetermined line leakage current a which is less than that required to seize or hold said line, the controller for automatically controlling dialing of a predetermined directory number over a PSTN line at a predetermined time, all for receiving from a dialed location via the PSTN line and storing, said data for further operation of the telephone dialer.

13. A dialer as defined in claim 12, in which the data for operation of the dialer are comprised of at least one of said digits to be added or substituted, operating programs, and operating parameters.

* * * * *